United States Patent
Reichow et al.

(10) Patent No.: US 10,000,168 B2
(45) Date of Patent: Jun. 19, 2018

(54) VEHICLE ELECTRICAL SYSTEM AND METHOD FOR OPERATING A VEHICLE ELECTRICAL SYSTEM

(71) Applicant: CONTINENTAL AUTOMOTIVE GMBH, Hannover (DE)

(72) Inventors: Dirk Reichow, Wenzenbach (DE); Tobias Galli, Roding (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 957 days.

(21) Appl. No.: 14/359,304

(22) PCT Filed: Nov. 13, 2012

(86) PCT No.: PCT/EP2012/072481
§ 371 (c)(1),
(2) Date: May 20, 2014

(87) PCT Pub. No.: WO2013/075975
PCT Pub. Date: May 30, 2013

(65) Prior Publication Data
US 2014/0354040 A1    Dec. 4, 2014

(30) Foreign Application Priority Data
Nov. 22, 2011  (DE) .......................... 10 2011 086 829

(51) Int. Cl.
*B60R 16/03*    (2006.01)
*H02J 1/08*     (2006.01)
*H02J 1/00*     (2006.01)

(52) U.S. Cl.
CPC ................ *B60R 16/03* (2013.01); *H02J 1/08* (2013.01); *H02J 2001/008* (2013.01)

(58) Field of Classification Search
CPC .......................... B60R 16/03; H02J 2001/008
See application file for complete search history.

(56) References Cited

U.S. PATENT DOCUMENTS

| | | | |
|---|---|---|---|
| 5,558,071 A * | 9/1996 | Ward ........................ | F02P 3/02 |
| | | | 123/598 |
| 5,886,503 A * | 3/1999 | McAndrews ...... | G01R 31/3658 |
| | | | 320/121 |

(Continued)

FOREIGN PATENT DOCUMENTS

| | | | |
|---|---|---|---|
| DE | 19645944 A1 | 5/1998 | ........... B60R 16/033 |
| DE | 19859036 A1 | 6/2000 | ................ H02J 7/34 |

(Continued)

OTHER PUBLICATIONS

International Search Report and Written Opinion, Application No. PCT/EP2012/072481, 23 pages, dated May 7, 2013.

(Continued)

*Primary Examiner* — Jared Fureman
*Assistant Examiner* — Emmanuel R Dominique
(74) *Attorney, Agent, or Firm* — Slayden Grubert Beard PLLC

(57) ABSTRACT

A vehicle electrical system includes a first system branch with a first nominal voltage $U_1$, a second system branch with a second nominal voltage U2, at least one DC/DC converter configured to transmit energy between the first and second system branches, a first actuating unit to actuate the DC/DC converter(s), a first detection unit to detect an instantaneous voltage $U_{act,1}$ of the first system branch, and a comparison unit to compare the detected instantaneous voltage $U_{act,1}$ to a first upper voltage threshold value $U_{o,1}$ and to a first lower voltage threshold value $U_{u,1}$, wherein $U_{u,1}<U_1<U_{o,1}$. The first actuating unit actuates the DC/DC converter(s) such that energy is transmitted from the first system branch to the second system branch if $U_{act,1}>U_{o,1}$, and such that energy is transmitted from the second system branch to the first system branch if $U_{act,1}<U_{u,1}$.

11 Claims, 2 Drawing Sheets

(56) References Cited

U.S. PATENT DOCUMENTS

| | | | | |
|---|---|---|---|---|
| 6,069,804 A * | 5/2000 | Ingman | H02J 7/0068 | |
| | | | 363/124 | |
| 6,232,674 B1 * | 5/2001 | Frey | H02J 7/1423 | |
| | | | 307/10.1 | |
| 6,437,462 B1 * | 8/2002 | Maple | H02M 3/1582 | |
| | | | 307/75 | |
| 6,713,894 B1 * | 3/2004 | Reimer | H02J 7/345 | |
| | | | 307/10.1 | |
| 7,679,337 B2 * | 3/2010 | Yoshida | B60L 11/185 | |
| | | | 320/104 | |
| 7,977,812 B2 | 7/2011 | Senda | 307/10.1 | |
| 8,482,245 B2 | 7/2013 | Kondo et al. | 318/801 | |
| 2002/0041502 A1 * | 4/2002 | Ulinksi | H02J 3/32 | |
| | | | 363/37 | |
| 2003/0151870 A1 | 8/2003 | Gronbach et al. | 361/91.1 | |
| 2009/0095052 A1 * | 4/2009 | Inoue | F02D 41/1454 | |
| | | | 73/23.32 | |
| 2009/0127930 A1 * | 5/2009 | Senda | B60R 16/03 | |
| | | | 307/9.1 | |
| 2009/0206660 A1 * | 8/2009 | Makita | H02J 7/1423 | |
| | | | 307/9.1 | |
| 2011/0149425 A1 * | 6/2011 | Hatagami | G11B 5/09 | |
| | | | 360/46 | |
| 2011/0304214 A1 | 12/2011 | Haddad | 307/82 | |

FOREIGN PATENT DOCUMENTS

| | | | |
|---|---|---|---|
| DE | 102005029081 A1 | 1/2007 | B60R 16/03 |
| DE | 102005057306 A1 | 6/2007 | B60R 16/03 |
| DE | 102006017921 A1 | 10/2007 | B60R 16/03 |
| DE | 102007017187 A1 | 10/2008 | B60R 16/03 |
| DE | 102008031125 A1 | 1/2010 | B60R 16/03 |
| DE | 102009034180 A1 | 2/2011 | B60R 16/03 |
| DE | 102010014104 A1 | 10/2011 | B60R 16/033 |
| DE | 102010015104 A1 | 10/2011 | B60R 16/02 |
| EP | 2149833 A1 | 2/2010 | G05F 5/00 |
| EP | 2395639 A2 | 12/2011 | H02M 3/158 |
| JP | 2004229447 A | 8/2004 | B60R 16/02 |
| JP | 2009130961 A | 6/2009 | B60L 7/16 |
| JP | 2009232526 A | 10/2009 | H01M 10/44 |
| JP | 2009293322 A | 12/2009 | B60K 6/46 |
| KR | 20030011329 A | 2/2003 | H02M 1/00 |
| WO | 2006/136380 A1 | 12/2006 | B60R 16/02 |
| WO | 2013/075975 A1 | 5/2013 | B60R 16/03 |

OTHER PUBLICATIONS

Chinese Office Action, Application No. 201280067716.2, 16 pages, dated Oct. 28, 2015.

Japanese Office Action, Application No. 2014-542768, 2 pages, dated Aug. 25, 2015.

Korean Office Action, Application No. 2017077996091, 6 pages, dated Nov. 8, 2017.

* cited by examiner

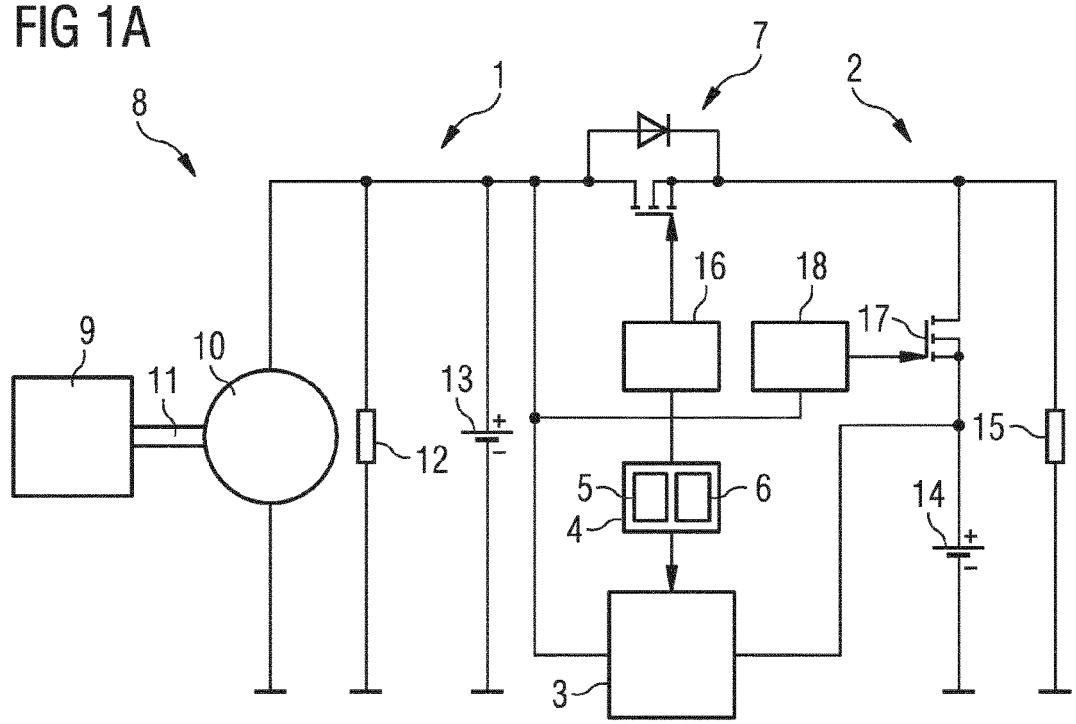
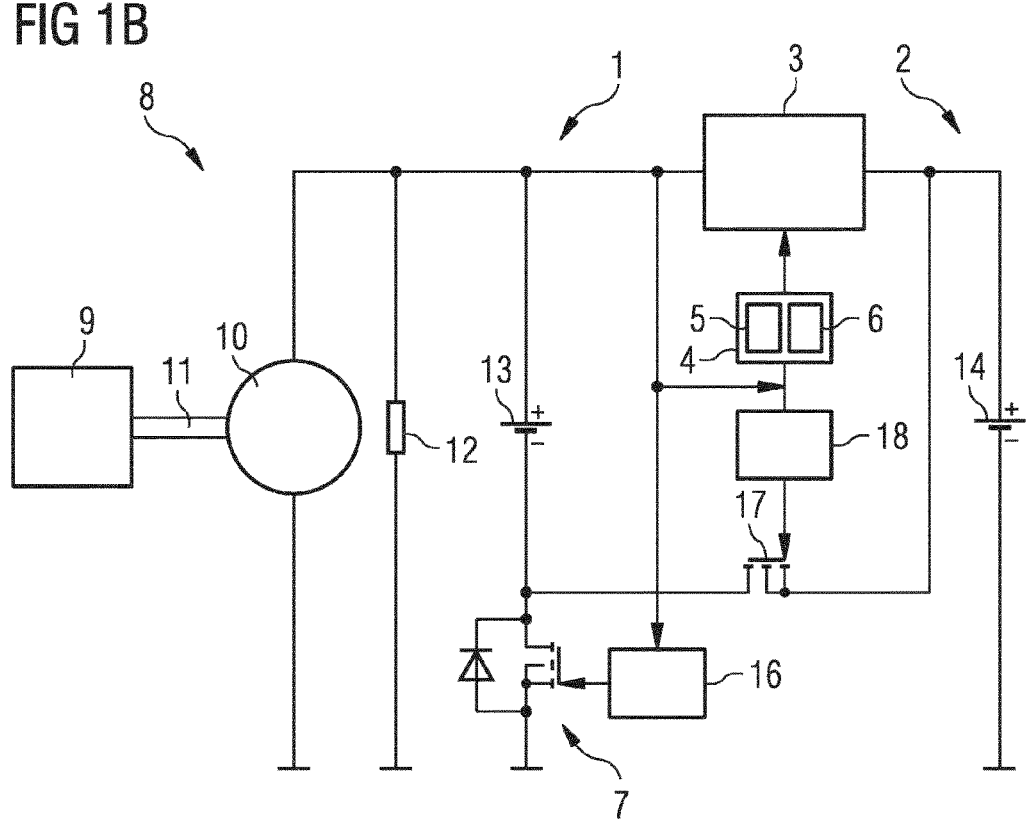

VEHICLE ELECTRICAL SYSTEM AND METHOD FOR OPERATING A VEHICLE ELECTRICAL SYSTEM

CROSS-REFERENCE TO RELATED APPLICATIONS

This application is a U.S. National Stage Application of International Application No. PCT/EP2012/072481 filed Nov. 13, 2012, which designates the United States of America, and claims priority to DE Application No. 10 2011 086 829.1 filed Nov. 22, 2011, the contents of which are hereby incorporated by reference in their entirety.

TECHNICAL FIELD

This application relates to a vehicle electrical system, a vehicle having a vehicle electrical system and a method for operating a vehicle electrical system.

BACKGROUND

DE 10 2005 057 306 A1 discloses a method for stabilizing a direct voltage vehicle electrical system, in particular in a motor vehicle, having a direct voltage converter which is arranged in the vehicle electrical system and which is fed on an input side by at least one electrical energy source and which has on an output side a plurality of voltage-stabilizing electrical outputs which are each connected to a part of the vehicle electrical system with electrical loads connected thereto. Sudden changes in electrical load which effect the input side of the direct voltage converter on at least one part of the vehicle electrical system which is sensitive to voltage fluctuations can be at least partially compensated by respective voltage stabilization at the respective outputs using control means by varying the voltage and/or the electrical load on at least one part of the vehicle electrical system which is insensitive to voltage fluctuations.

SUMMARY

A vehicle electrical system, comprising a first vehicle electrical system branch with a first nominal voltage $U_1$, a second vehicle electrical system branch with a second nominal voltage $U_2$, at least one DC/DC converter which is designed to transfer energy between the first vehicle electrical system branch and the second vehicle electrical system branch, a first actuating unit which is designed to actuate the at least one DC/DC converter, a first detection unit which is designed to detect an instantaneous voltage $U_{act,1}$ of the first vehicle electrical system branch, a first comparison unit which is designed to compare the detected instantaneous voltage $U_{act,1}$ with a first upper voltage threshold value $U_{o,1}$ and a first lower voltage threshold value $U_{u,1}$, where $U_{u,1}<U_1<U_{o,1}$, wherein the first actuating unit is designed to actuate the at least one DC/DC converter in such a way that energy is transferred from the first vehicle electrical system branch to the second vehicle electrical system branch if $U_{act,1}>U_{o,1}$, and that energy is transferred from the second vehicle electrical system branch to the first vehicle electrical system branch if $U_{act,1}<U_{u,1}$.

In a further embodiment, the first comparison unit has at least one comparator.

In a further embodiment, the first comparison unit is also designed to compare the detected instantaneous voltage $U_{act,1}$ with a second upper voltage threshold value $U_{o,2}$ and a second lower voltage threshold value $U_{u,2}$, where $U_{u,1}<U_{u,2}<U_1$ and $U_1<U_{o,2}<U_{o,1}$.

In a further embodiment, the first actuating unit is also designed to actuate the at least one DC/DC converter in such a way that the transfer of energy from the first vehicle electrical system branch to the second vehicle electrical system branch is ended if $U_{act,1}<U_{o,2}$, and that the transfer of energy from the second vehicle electrical system branch to the first vehicle electrical system branch is ended if $U_{act,1}>U_{u,2}$.

In a further embodiment, the vehicle electrical system also includes a voltage-limiting switch.

In a further embodiment, the voltage-limiting switch has at least one freewheeling diode.

In a further embodiment, the vehicle electrical system further includes a second detection unit which is designed to detect an instantaneous voltage $U_{act,2}$ of the second vehicle electrical system branch and a second comparison unit which is designed to compare the detected instantaneous voltage $U_{act,2}$ with a third upper voltage threshold value $U_{o,3}$ and a third lower voltage threshold value $U_{u,3}$, where $U_{u,3}<U_2<U_{o,3}$.

In a further embodiment, the first actuating unit is also designed to actuate the at least one DC/DC converter in such a way that energy is transferred from the second vehicle electrical system branch to the first vehicle electrical system branch if $U_{act,2}>U_{o,3}$, and that energy is transferred from the first vehicle electrical system branch to the second vehicle electrical system branch if $U_{act,2}<U_{u,3}$.

In a further embodiment, the at least one DC/DC converter is embodied as a synchronous converter.

Another embodiment provides a vehicle having any of the vehicle electrical systems disclosed above.

Another embodiment provides a method for operating a vehicle electrical system, wherein the vehicle electrical system has a first vehicle electrical system branch with a first nominal voltage $U_1$, a second vehicle electrical system branch with a second nominal voltage $U_2$ and at least one DC/DC converter for transferring energy between the first vehicle electrical system branch and the second vehicle electrical system branch, and wherein the method has the following steps: detecting a first value of an instantaneous voltage $U_{act,1}$ of the first vehicle electrical system branch, comparing the detected first value of the instantaneous voltage $U_{act,1}$ with a first upper voltage threshold value $U_{o,1}$ and a first lower voltage threshold value $U_{u,1}$, where $U_{u,1}<U_1<U_{o,1}$, and if $U_{act,1}>U_{o,1}$, actuating the at least one DC/DC converter in such a way that energy is transferred from the first vehicle electrical system branch to the second vehicle electrical system branch, and if $U_{act,1}<U_{u,1}$, actuating the at least one DC/DC converter in such a way that energy is transferred from the second vehicle electrical system branch to the first vehicle electrical system branch.

In a further embodiment, if $U_{act,1}>U_{o,1}$, the method also has the following steps after the actuation of the at least one DC/DC converter: detecting a second value of the instantaneous voltage $U_{act,1}$ of the first vehicle electrical system branch, comparing the detected second value of the instantaneous voltage $U_{act,1}$ with a second upper voltage threshold value $U_{o,2}$, where $U_1<U_{o,2}<U_{o,1}$, and if $U_{act,1}<U_{o,2}$, ending the transfer of energy from the first vehicle electrical system branch to the second vehicle electrical system branch.

In a further embodiment, if $U_{act,1}>U_{o,1}$ the transfer of energy from the first vehicle electrical system branch to the second vehicle electrical system branch is ended after a predetermined time period.

In a further embodiment, if $U_{act,1}<U_{u,1}$ the method also has the following steps after the actuation of the at least one DC/DC converter: detecting a second value of the instantaneous voltage $U_{act,1}$ of the first vehicle electrical system branch, comparing the detected second value of the instantaneous voltage $U_{act,1}$ with a second lower voltage threshold value $U_{u,2}$, where $U_{u,1}<U_{u,2}<U_1$, and if $U_{act,1}>U_{u,2}$ ending the transfer of energy from the second vehicle electrical system branch to the first vehicle electrical system branch.

In a further embodiment, if $U_{act,1}<U_{u,1}$ the transfer of energy from the second vehicle electrical system branch to the first vehicle electrical system branch is ended after a predetermined time period.

BRIEF DESCRIPTION OF THE DRAWINGS

Example embodiments of the invention are explained in more detail below with reference to the appended drawings, in which:

FIG. 1A shows a block circuit diagram of a vehicle electrical system according to a first embodiment of the application;

FIG. 1B shows a block circuit diagram of a vehicle electrical system according to a second embodiment of the application;

DETAILED DESCRIPTION

Figure 2:
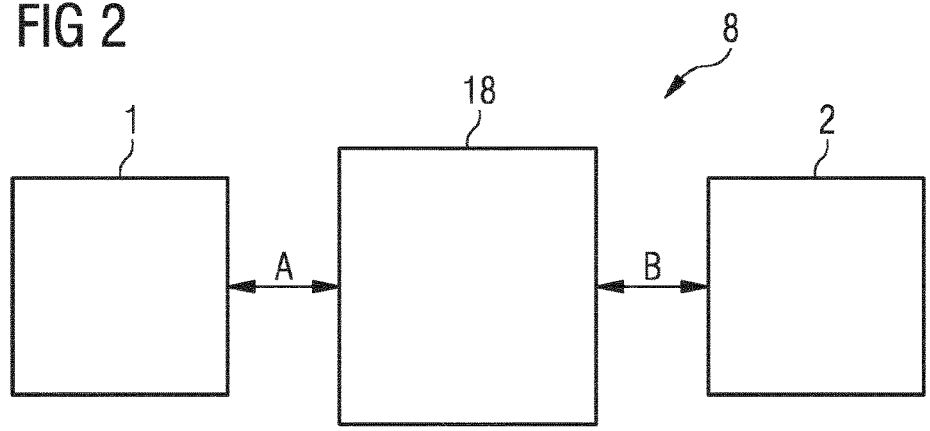
FIG. 2 shows a basic circuit diagram of a vehicle electrical system according to the application.

Embodiments of the invention provide a vehicle electrical system, a vehicle having a vehicle electrical system and a method for operating a vehicle electrical system which permit further improved voltage stabilization.

One embodiment provides a vehicle electrical system having a first vehicle electrical system branch with a first nominal voltage $U_1$ and a second vehicle electrical system branch with a second nominal voltage $U_2$. In addition, the vehicle electrical system has at least one DC/DC converter which is designed to transfer energy at least between the first vehicle electrical system branch and the second vehicle electrical system branch. Furthermore, the vehicle electrical system has a first actuating unit which is designed to actuate the at least one DC/DC converter. Furthermore, the vehicle electrical system has a first detection unit which is designed to detect an instantaneous voltage $U_{act,1}$ of the first vehicle electrical system branch. In addition, the vehicle electrical system has a first comparison unit which is designed to compare the detected instantaneous voltage $U_{act,1}$ with a first upper voltage threshold value $U_{o,1}$ and a first lower voltage threshold value $U_{u,1}$, where $U_{u,1}<U_1<U_{o,1}$. The first actuating unit is designed to actuate the at least one DC/DC converter in such a way that energy is transferred from the first vehicle electrical system to the second vehicle electrical system if $U_{act,1}>U_{o,1}$. Furthermore, the first actuating unit is designed to actuate the at least one DC/DC converter in such a way that energy is transferred from the second vehicle electrical system branch to the first vehicle electrical system branch if $U_{act,1}<U_{u,1}$.

The vehicle electrical system may permit further improved voltage stabilization in the first vehicle electrical system branch, in particular by providing the at least one DC/DC converter and the first actuating unit which is correspondingly designed to actuate the DC/DC converter. In this context, transferring energy from the first vehicle electrical system branch to the second vehicle electrical system branch if $U_{act,1}>U_{o,1}$ permits an instantaneous overvoltage in the first vehicle electrical system branch to be reduced and/or compensated. Furthermore, transferring energy from the second vehicle electrical system branch to the first vehicle electrical system branch if $U_{act,1}<U_{u,1}$ permits an instantaneous undervoltage in the first vehicle electrical system branch also to be reduced and/or compensated. As a result, the voltage in the first vehicle electrical system branch can advantageously be held at a value which corresponds essentially to the first nominal voltage $U_1$. In particular, fluctuations in the vehicle electrical system while changes in load occur in the first vehicle electrical system branch can be compensated.

In one embodiment of the vehicle electrical system, the first comparison unit has at least one comparator. This permits the detected instantaneous voltage $U_{act,1}$ to be easily compared with the first upper voltage threshold value $U_{o,1}$ and the first lower voltage threshold value $U_{u,1}$.

In addition, the first comparison unit can be designed to compare the detected instantaneous voltage $U_{act,1}$ with a second upper voltage threshold value $U_{o,2}$ and a second lower voltage threshold value $U_{u,2}$, where $U_{u,1}<U_{u,2}<U_1$ and $U_1<U_{o,2}<U_{o,1}$.

The first actuating unit may be designed here to actuate the at least DC/DC converter in such a way that the transfer of energy from the first vehicle electrical system to the second vehicle electrical system is ended if $U_{act,1}<U_{o,2}$. Furthermore, the first actuating unit in the specified embodiment is designed to actuate the at least one DC/DC converter in such a way that the transfer of energy from the second vehicle electrical system branch to the first vehicle electrical system branch is ended if $U_{act,1}>U_{u,2}$. The specified embodiments permit hysteresis behavior to be taken into account during the actuation of the at least one DC/DC converter by comparing the instantaneous voltage $U_{act,1}$ of the first vehicle electrical system branch with the second upper voltage threshold value $U_{o,2}$ and the second lower voltage threshold value $U_{u,2}$.

In a further embodiment, the vehicle electrical system also has a voltage-limiting switch. The voltage-limiting switch can have here at least one freewheeling diode. Furthermore, the voltage-limiting switch can be formed by an inherent body diode of a MOSFET. The provision of such voltage-limiting switches permits the voltage in the first vehicle electrical system branch to be stabilized further, in particular in the case of low overvoltage values.

In addition, the vehicle electrical system can have a second detection unit which is designed to detect an instantaneous voltage $U_{act,2}$ of the second vehicle electrical system branch. In this embodiment, the vehicle electrical system also has a second comparison unit which is designed to compare the detected instantaneous voltage $U_{act,2}$ with a third upper voltage threshold value $U_{o,3}$ and a third lower voltage threshold value $U_{u,3}$, where $U_{u,3}<U_2<U_{o,3}$.

The first actuating unit may be designed here to actuate the at least one DC/DC converter in such a way that energy is transferred from the second vehicle electrical system branch to the first vehicle electrical system branch if $U_{act,2}>U_{o,3}$. In addition, the first actuating unit is preferably designed to actuate the at least one DC/DC converter in such a way that energy is transferred from the first vehicle electrical system branch to the second vehicle electrical system branch if $U_{act,2}<U_{u,3}$. The specified embodiments advantageously permit improved voltage stabilization in the second vehicle electrical system branch. In this context, overvoltages in the second vehicle electrical system branch can be reduced and/or compensated by transferring energy to the first vehicle electrical system branch, and undervoltages in the second vehicle electrical system branch can be reduced and/or compensated by transferring energy from the first vehicle electrical system branch.

The at least one DC/DC converter may be embodied as a synchronous converter for a bidirectional transfer of energy between the first vehicle electrical system branch and the second vehicle electrical system branch.

Another embodiment provides a vehicle which has a vehicle electrical system as disclosed herein. The vehicle is, for example, a motor vehicle, in particular a passenger car or a truck, and can be embodied as a hybrid vehicle or vehicle with pure internal combustion engine drive.

Another embodiment provides a method for operating a vehicle electrical system, wherein the vehicle electrical system has a first vehicle electrical system branch with a first nominal voltage $U_1$, a second vehicle electrical system branch with a second nominal voltage $U_2$ and at least one DC/DC converter for transferring energy at least between the first vehicle electrical system branch and the second vehicle electrical system branch. The method has the following steps. A first value of an instantaneous voltage $U_{act,1}$ of the first vehicle electrical system branch is detected. In addition, the detected first value of the instantaneous voltage $U_{act,1}$ is compared with a first upper voltage threshold value $U_{o,1}$ and a first lower voltage threshold value $U_{u,1}$, where $U_{u,1}<U_1<U_{o,1}$. If $U_{act,1}>U_{o,1}$, the at least one DC/DC converter is actuated in such a way that energy is transferred from the first vehicle electrical system branch to the second vehicle electrical system branch. If $U_{act,1}<U_{u,1}$, the at least one DC/DC converter is actuated in such a way that energy is transferred from the second vehicle electrical system branch to the first vehicle electrical system branch.

The method may provide any or all of the same advantages as discussed in relation to the vehicle electrical system.

If $U_{act,1}>U_{o,1}$, in one embodiment the method also has the following steps after the actuation of the at least one DC/DC converter. A second value of the instantaneous voltage $U_{act,1}$ of the first vehicle electrical system branch is detected. In addition, the detected second value of the instantaneous voltage $U_{act,1}$ is compared with a second upper voltage threshold value $U_{o,2}$, where $U_1<U_{o,2}<U_{o,1}$. If $U_{act,1}<U_{o,2}$, the transfer of energy from the first vehicle electrical system branch to the second vehicle electrical system branch is ended.

In a further embodiment, if $U_{act,1}>U_{o,1}$ the transfer of energy from the first vehicle electrical system branch to the second vehicle electrical system branch is ended after a predetermined time period.

In a further embodiment, if $U_{act,1}<U_{u,1}$ the method also has the following steps after the actuation of the at least one DC/DC converter. A second value of the instantaneous voltage $U_{act,1}$ of the first vehicle electrical system branch is detected. Furthermore, the detected second value of the instantaneous voltage $U_{act,1}$ is compared with a second layer voltage threshold value $U_{u,2}$, where $U_{u,1}<U_{u,2}<U_1$. If $U_{act,1}>U_{u,2}$, the transfer of energy from the second vehicle electrical system branch to the first vehicle electrical system branch is ended.

If $U_{act,1}<U_{u,1}$, in a further embodiment of, the transfer of energy from the second vehicle electrical system the method to the first vehicle electrical system branch is ended after a predetermined time period.

In the abovementioned embodiments, the first nominal voltage $U_1$ can be higher or lower than the second nominal voltage $U_2$. Furthermore, the first nominal voltage $U_1$ can correspond to the second nominal voltage $U_2$.

The voltage values and voltage threshold values specified in the application are understood here to mean in each case the absolute value of the voltage, that is to say the specified voltages each have a non-negative sign.

FIG. 1A shows a block circuit diagram of a vehicle electrical system 8 according to a first embodiment of the application. The vehicle electrical system 8 can be, for example, a component of a motor vehicle (not illustrated in more detail), in particular of a passenger car or of a truck.

The vehicle electrical system 8 has a first vehicle electrical system branch 1 with a first nominal voltage $U_1$, which can also be referred to as $V_{sys1}$, and a second vehicle electrical system branch 2 with a second nominal voltage $U_2$, which can also be referred to as $V_{sys2}$.

In the embodiment shown, a generator 10, at least an electrical load 12 and an electrical energy storage device 13, for example in the form of a 12 volt accumulator, are arranged in the first vehicle electrical system branch 1. The generator 10 is connected via a mechanical coupling 11, for example a V-ribbed belt, to an engine 9, wherein the engine 9 is embodied as an internal combustion engine.

In the embodiment shown, an electrical energy storage device 14, for example in the form of a 12 volt accumulator, and at least one electrical load 15, are arranged in the second vehicle electrical system branch 2.

A DC/DC converter 3 is arranged between the first vehicle electrical system branch 1 and the second vehicle electrical system branch 2. The DC/DC converter 3 is embodied as a bidirectional direct voltage converter which can, in particular, convert the first nominal voltage $U_1$ into the second nominal voltage $U_2$, and vice versa. For this purpose, the DC/DC converter 3 is embodied as a synchronous converter in the embodiment shown. Furthermore, it is possible to provide a first DC/DC converter, which is embodied as a step-up converter or boost converter, and a second DC/DC converter, which is embodied as a step-down converter or block converter.

The vehicle electrical system 8 also has a first actuating unit 4 which is designed to actuate the at least one DC/DC converter 3. The first actuating unit 4 is coupled or connected here to the positive terminal of the first vehicle electrical system branch 1. In the embodiment shown, the first actuating unit 4 has a first detection unit 5 which is designed to detect an instantaneous voltage $U_{act,1}$ of the first vehicle electrical system branch 1. Furthermore, the first actuating unit 4 has a first comparison unit 6 which is designed to compare the detected instantaneous voltage $U_{act,1}$ with a first upper voltage threshold value $U_{o,1}$ and a first lower voltage threshold value $U_{u,1}$, where $U_{u,1}<U_1<U_{o,1}$. The first comparison unit 6 has, for example, at least one comparator for this purpose.

The first actuating unit 4 is designed to actuate the DC/DC converter 3 in such a way that energy is transferred from the first vehicle electrical system branch 1 to the second vehicle electrical system branch 2 if $U_{act,1}>U_{o,1}$. The first actuating unit 4 is further designed in such a way that energy is transferred from the second vehicle electrical system branch 2 to the first vehicle electrical system branch 1 if $U_{act,1}<U_{u,1}$.

Further, the vehicle electrical system 8 has a voltage-limiting switch 7 which is embodied as a MOSFET in the embodiment shown, and a second actuating unit 16 for actuating the voltage-limiting switch 7. The voltage-limiting switch 7 is connected to the positive paths of the first vehicle electrical system branch 1 and of the second vehicle electrical system branch and is connected electrically in parallel with the DC/DC converter 3.

Furthermore, the second actuating unit 16 is coupled to the positive path of the first vehicle electrical system branch 1.

In addition, the vehicle electrical system 8 has a power switch 17 and a control unit 18 for actuating the power switch 17. The power switch 17 is embodied here as a MOSFET in the embodiment shown, wherein the inherent body diode of the MOSFET in FIG. 1A is not illustrated in more detail. The power switch 17 is connected to the voltage-limiting switch 7 and to the positive path of the electrical energy storage device 14 of the second vehicle electrical system branch 2.

During a nominal operating state of the vehicle electrical system 8, i.e. operation within the abovementioned voltage threshold values, the voltage-limiting switch 7 is closed and the power switch 17 is opened. Further details of the voltage-limiting switch 7 and of the power switch 17 are explained in more detail below.

Fluctuations in the vehicle electrical system during the occurrence of changes in load can be compensated by means of the embodiment shown. The changes in load relate here to an electrical system having at least one electronic switch in the form of the voltage-limiting switch 7 and at least one voltage converter module in the form of the DC/DC converter 3. The system is in a nominal system state here.

Requirements such as, for example, guaranteed switch-on resistance, continuity resistance, which is also referred to as $R_{ds,on}$, assistance of the linear operation, which is also referred to as the linear mode, are typically made of the voltage-limiting switch 7. The DC/DC converter 3 is typically subject to requirements such as, for example, the exchange of energy between the two energy systems in the form of the first electrical vehicle system branch 1 and the second electrical vehicle system branch 2.

In this context, the DC/DC converter 3 controls the current between the two energy systems. The DC/DC converter 3 is, in the embodiment shown, in a discharge mode, which is also referred to as MD1, or in a charge mode, which is also referred to as MD2. The specified operating modes are typically provided for long-term charging or discharging of the second energy system in the form of the second vehicle electrical system branch 2 or of the first energy system in the form of the first vehicle electrical system branch 1. Furthermore, the DC/DC converter 3 can be in a quiescent state, which is also referred to as the standby mode or MD0.

The vehicle electrical system 8 can be embodied in a most cost-effective and voltage-stable fashion through the use of the recharging unit in the form of the DC/DC converter 3 or of the at least one switch in the form of the voltage-limiting switch 7, and a braking torque which is produced by a change in load and which acts on the internal combustion engine, i.e. the engine 9, can be minimized. In particular, the functionality of the DC/DC converter 3 is thereby extended. This permits a predefined voltage state of the vehicle electrical system 8 to be obtained in the case of changes in load in the first vehicle electrical system branch 1. Changes in load can bring about undervoltages or overvoltages in the vehicle electrical system 8 in this context, wherein these can be reduced by actuating the DC/DC converter 3 or the voltage-limiting switch 7, as is explained further below.

In this respect, a vehicle electrical system state with overvoltage will firstly be considered. In this state, the generator 10 cannot independently compensate a vehicle electrical system overvoltage due to a lack of loads. In a vehicle electrical system state with overvoltage in the first vehicle electrical system branch 1, wherein there is a random magnitude of the vehicle electrical system overvoltage, the DC/DC converter 3 is actuated for voltage stabilization. The DC/DC converter 3 can be used here as a second stage or as a single stage. As a result, what is referred to as load dumping, i.e. the occurrence of voltage peaks, can be eliminated or suppressed, and the amplitude and mean value thereof can be reduced.

In this respect, for example the vehicle electrical system voltage in the first vehicle electrical system branch 1 is measured by means of a comparator circuit in the first actuating unit 4 and compared with the first upper voltage threshold value $U_{o,1}$. When the voltage threshold value, i.e. the first upper voltage threshold value $U_{o,1}$, is exceeded, the DC/DC converter 3 is operated as a load sink.

The DC/DC converter 3 is for this purpose activated by means of the first actuating unit 4, typically in the microsecond to millisecond range in a "sink/source" mode, which is also referred to as MD3, and in the process transports excessive energy or portions of the energy from the first vehicle electrical system branch 1 to the second vehicle electrical system branch 2. In this way, a reduction in the overvoltage within the first vehicle electrical system branch 1 and a more controlled voltage increase in the second vehicle electrical system branch 2 is brought about. In addition, a typically small part of the overvoltage energy from the first vehicle electrical system branch 1 is converted or dissipated in the form of heat in the DC/DC converter 3.

When a hysteresis value in the form of a second upper voltage threshold value $U_{o,2}$ is undershot, where $U_1 < U_{o,2} < U_{0,1}$, the DC/DC converter 3 is changed back into a quiescent mode. The operation of the DC/DC converter 3 in the sink mode is typically chronologically limited and is therefore configured, in particular, for transient fluctuations of the vehicle electrical system. If this chronological limit is exceeded, the first actuating unit 4 switches the DC/DC converter 3 into the quiescent mode until a renewed requirement, for example by means of a microcontroller, changes the DC/DC converter 3 back into the sink or source mode.

An undervoltage vehicle electrical system state is typically operation in which a vehicle electrical system undervoltage can not be dynamically compensated independently by a combination of the generator 10 and electrical energy storage device 13, for example due to a lack of engine torque, generator control behaviour, power capacity or excessively high intrinsic or vehicle electrical system impedances Z. Undervoltages are typically caused by sudden changes in load, in particular in conjunction with an unfavorable engine torque.

An undervoltage state can in turn be compensated or reduced by means of the DC/DC converter 3. In this context, the magnitude of the vehicle electrical system undervoltage is typically random. A transient voltage dip can be eliminated or suppressed, or the amplitude and mean value thereof can be reduced.

For this purpose, the vehicle electrical system voltage in the first vehicle electrical system branch 1 is measured by means of, for example, a comparator circuit in the first actuating unit 4 and is compared with a first lower voltage threshold value $U_{u,1}$. If the voltage threshold value in the form of the first lower voltage threshold value $U_{u,1}$ is undershot, the DC/DC converter 3 is operated as a source.

The DC/DC converter 3 is for this purpose typically actuated in the microsecond range to millisecond range in the "sink/source" mode, which, as already explained, is also referred to as the MD3, by means of the first actuating unit 4, and in this context transports a corresponding portion of the stored energy from the second vehicle electrical system branch 2 to the first vehicle electrical system branch 1. As a result, a reduction is brought about in the undervoltage within the first vehicle electrical system branch 1, and a controlled drop in the voltage is brought about in the second vehicle electrical system branch 2.

When a hysteresis value above the first lower voltage threshold value $U_{u,1}$ is exceeded, the DC/DC converter 3 in the embodiment shown is changed again into the quiescent state. The operation of the DC/DC converter 3 in the source mode is typically chronologically limited and therefore configured, in particular, for transient fluctuations in the vehicle electrical system. If this chronological limit is exceeded, the first actuating unit 4 switches the DC/DC converter 3 in the embodiment shown into the quiescent state until a renewed request, for example via a microcontroller, changes the DC/DC converter 3 back into the sink or source mode.

Therefore, in the case of undervoltage states the DC/DC converter transports energy in the form of electrical charge from the second vehicle electrical system branch 2 to the first vehicle electrical system branch 1 if a request by means of a corresponding system variable is present.

In addition to an undershooting of the first lower voltage threshold value $U_{u,1}$, it is for this purpose additionally possible to use a change in current, measured by the first actuating unit 4, in the first vehicle electrical system branch 1 or the definition of a decreasing engine rotational speed with the simultaneous request for a constant or accelerated engine rotational speed. Undervoltages which occur in the first vehicle electrical system branch 1 are therefore prevented or reduced. Furthermore, the voltage in the second vehicle electrical system branch 2 decreases.

In the case of overvoltage states, the DC/DC converter 3 transports energy in the form of electrical charge from the first vehicle electrical system branch 1 to the second vehicle electrical system branch 2 if a request by means of a corresponding system variable is present. In addition to exceeding of the first upper voltage threshold value $U_{o,1}$, it is for this purpose additionally possible to use a change in current, measured by the first actuating unit 4, in the first vehicle electrical system branch 1 or the detection of an increasing engine rotational speed with a simultaneous request for a constant or reduced engine rotational speed. Overvoltages which occur in the first vehicle electrical system branch 1 are therefore prevented or reduced. Furthermore, the voltage in the second vehicle electrical system branch 2 increases.

In the mode which is also referred to as MD3, in this context the decision is made as to whether the DC/DC converter 3 is operated in the energy sink or "sink" operating mode or in the energy source or "source" operating mode, by means of the corresponding comparators of the comparison unit 6. In both specified operating modes or states energy is transported by the DC/DC converter 3.

A cost advantage can be achieved by means of the embodiment shown by virtue of the possibility of being able to use, with system adjustment in accordance with the generator 10, electrical energy storage device 13, electrical load 12 and the power impedances, the available energy from the second vehicle electrical system branch 2. As a result, in particular the generator 10 and the electrical energy storage device 13 can be implemented in relatively small power classes.

The application can be applied here in potential-isolated and non-potential-isolated systems as well as in switching topologies in the ground path as well as in the positive path.

The first upper voltage threshold value $U_{o,1}$ and the first lower voltage threshold value $U_{u,1}$ as well as the further voltage threshold values can, in a further embodiment, be adapted dynamically, for example to a changed temperature or a changed setpoint value of the voltage which is generated by the generator 10.

FIG. 1B shows a block circuit diagram of a vehicle electrical system 8 according to a second embodiment of the application. Components with the same functions as in FIG. 1A are characterized by the same reference symbols and not explained once more below.

In the second embodiment which is shown, the vehicle electrical system 8 also has a power switch 17 and a control unit 18 for actuating the power switch 17. The power switch 17 is embodied here in the embodiment shown as a MOSFET, wherein the inherent body diode of the MOSFET is not illustrated in more detail in FIG. 1B. The power switch 17 is connected to the ground path of the electrical energy storage device 13 of the first vehicle electrical system branch 1 and to the positive path of the electrical energy storage device 14 of the second vehicle electrical system branch 2, which is embodied in the second embodiment as, for example, a 5 volt accumulator, and said power switch 17 thereby permits, given corresponding actuation by the control unit 18, a series connection of the two energy storage devices and therefore allows the voltage in the first vehicle electrical system branch 1 to be raised. This is advantageous, in particular, if the electrical load 12 is embodied as a high current load. The control unit 18 is coupled here to the positive path of the first vehicle electrical system branch 1.

Furthermore, in the second embodiment shown the voltage-limiting switch 7 is arranged in the ground path of the electrical energy storage device 13. The second actuating unit 16 of the voltage-limiting switch 7 is coupled to the positive path of the first vehicle electrical system branch 1.

During a nominal operating state of the vehicle electrical system 8, i.e. operation within the above-mentioned voltage threshold value, the voltage-limiting switch 7 is closed and the power switch 17 is opened.

In an overvoltage application, in the case of low vehicle electrical system overvoltages, also referred to as $V_{ov1}$, the voltage-limiting switch 7 can reduce, in a linear operation in a first stage, an occurring overvoltage component by the voltage $V_{sw1}$ with 0 V to $V_d$, wherein $V_d$ is the diode flow voltage of the inherent body diode of the voltage-limiting switch 7 which is embodied as a MOSFET in the embodiment which is shown. As a result, closed-loop or open-loop control can be performed of an overvoltage target value of the vehicle electrical system voltage. When the voltage threshold value is exceeded, closed-loop control is performed of the voltage-limiting switch 7 in the linear operating mode by means of the second actuating unit 16 with a first closed-loop control target value. When a hysteresis value underneath the first closed-loop control target value is undershot, the voltage-limiting switch 7 is changed back into the on mode.

The operation of the voltage-limiting switch 7 in the linear mode is not chronologically limited here.

Therefore, in the case of overvoltage states the voltage-limiting switch 7 also functions alongside the DC/DC converter 3 as a controllable power sink. In this context, the voltage-limiting switch 7 operates in the linear operating mode by means of the closed-loop control unit or the second actuating unit 16. As a result of the body diode which is inherently contained in the voltage-limiting switch 7 in the form of a MOSFET it is possible to eliminate very quickly overvoltages of up to typically 0.7 V. In the linear operating mode of the voltage-limiting switch 7, the effective voltage at said switch is negative and the system overvoltage which occurs can therefore be reduced. The effective linear voltage range of the voltage-limiting switch 7 is typically between 0 V and 0.7 V. The limiting effect is here the flux voltage of the body diode, which is typically approximately 0.7 V. It is relevant for the position of the voltage-limiting switch 7 in the system here that the voltage-limiting switch 7 can isolate the system load at least from the electrical energy storage device 13 and at least in one direction of the current.

The voltage-limiting switch 7 according to the first embodiment shown in FIG. 1A can also function as a power sink in overvoltage states, wherein for this purpose the power switch 17 is closed in this embodiment.

FIG. 2 shows a basic circuit diagram of a vehicle electrical system 8 according to the application. Components with the same functions as in the preceding figures are characterized by the same reference symbols and will not be explained once more below.

As is illustrated schematically in FIG. 2, energy can be exchanged between the first vehicle electrical system branch 1 and the second vehicle electrical system branch 2 by means of a control unit 18. The control unit 18 has for this purpose at least one DC/DC converter which is not presented in more detail as well as an actuating unit for actuating the DC/DC converter. The transfer of energy between the first vehicle electrical system branch 1, the control unit 18 and the second vehicle electrical system branch 2 is illustrated schematically here by means of arrows A and B.

Figure 3:
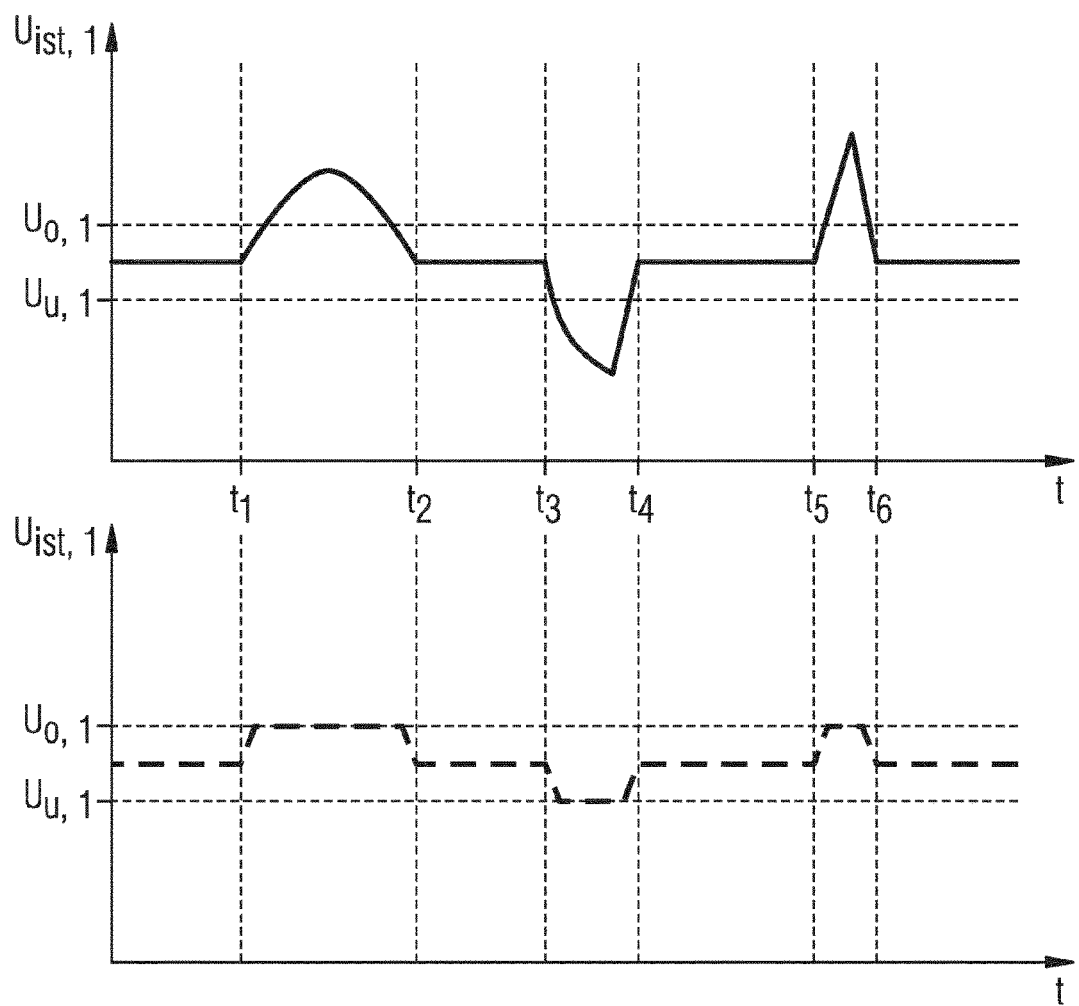
FIG. 3 shows voltage/time diagrams in a first vehicle electrical system branch of a vehicle electrical system.

FIG. 3 shows the voltage/time diagrams in a first vehicle electrical system branch of a vehicle electrical system. In this context, the time profile of the instantaneous voltage of the first vehicle electrical system branch is plotted.

The profile of the voltage which occurs without the actuation of the DC/DC converter explained above is illustrated schematically with a continuous line in the upper voltage/time diagram in FIG. 3. Between the times $t_1$ and $t_2$ as well as $t_5$ and $t_6$ there is an overvoltage present in the first vehicle electrical system branch, whereas between the times $t_3$ and $t_4$ there is an undervoltage present in the first vehicle electrical system branch. The time intervals between $t_1$ and $t_2$ as well as $t_3$ and $t_4$ constitute, for example, voltage fluctuations in the millisecond range and the time interval between $t_5$ and $t_6$ constitutes, for example, a voltage fluctuation in the microsecond range. The overvoltages here exceed a first upper voltage threshold value $U_{o,1}$, and the undervoltages undershoot a first lower voltage threshold value $U_{u,1}$.

As is illustrated schematically by a dashed line in the lower voltage/time diagram in FIG. 3, it is possible, by actuating the DC/DC converter in such a way that energy is transferred from the first vehicle electrical system branch to the second vehicle electrical system branch when the first upper voltage threshold value $U_{o,1}$ is exceeded, for the amplitude of the overvoltage to be limited to this voltage threshold value. Furthermore, by actuating the DC/DC converter in such a way that in the case of the first lower voltage threshold value $U_{u,1}$ being undershot, energy is transferred from the second vehicle electrical system branch to the first vehicle electrical system branch, it is possible for the amplitude of the undervoltage to be limited to this threshold value. Overall, there is therefore stabilization of the voltage profile in the first vehicle electrical system branch.

In this context, system lag times, in particular of the DC/DC converter are to be taken into account, which lag times are do not occur between a changeover of the operating modes "sink" and "source" and an associated reversal of direction of the transportation of energy between the two vehicle electrical system branches within which overvoltages and undervoltages which occur are typically not completely compensated. Such system lag times can, in particular, be configurable.

LIST OF REFERENCE SYMBOLS

1 Vehicle electrical system branch
2 Vehicle electrical system branch
3 DC/DC converter
4 Actuating unit
5 Detection unit
6 Comparison unit
7 Voltage-limiting switch
8 Vehicle electrical system
9 Engine
10 Generator
11 Coupling
12 Load
13 Energy storage device
14 Energy storage device
15 Load
16 Actuating unit
17 Power switch
18 Control unit
A Arrow
B Arrow

What is claimed is:
1. A vehicle electrical system, comprising:
a first vehicle electrical system branch with a first nominal voltage U1,
a second vehicle electrical system branch with a second nominal voltage U2,
at least one DC/DC converter configured to transfer energy between the first vehicle electrical system branch and the second vehicle electrical system branch,
a first actuating unit configured to actuate the at least one DC/DC converter,
a first detection unit configured to detect an instantaneous voltage Uact, 1 of the first vehicle electrical system branch, and
a first comparison unit configured to compare the detected instantaneous voltage Uact,1 with a first upper voltage threshold value Uo,1 and a first lower voltage threshold value Uu,1, where Uu,1<U1<Uo,1,
wherein the first actuating unit is configured to actuate the at least one DC/DC converter such that energy is transferred from the first vehicle electrical system branch to the second vehicle electrical system branch if Uact,1>Uo,1, and such energy is transferred from the second vehicle electrical system branch to the first vehicle electrical system branch if Uact,1<Uu,1,
wherein if Uact,1>Uo,1, after the actuation of the at least one DC/DC converter:
the first detection unit detects a second value of the instantaneous voltage Uact,1 of the first vehicle electrical system branch,
the first comparison unit compares the detected second value of the instantaneous voltage Uact,1 with a second upper voltage threshold value Uo,2, where U1<Uo,2<Uo,1, and if Uact,1<Uo,2, the first actuation unit ends the transfer of energy from the first vehicle electrical system branch to the second vehicle electrical system branch, and wherein if Uact,1<Uu,1, after the actuation of the at least one DC/DC converter:
the first detection unit detects a second value of the instantaneous voltage Uact,1 of the first vehicle electrical system branch,
the first comparison unit compares the detected second value of the instantaneous voltage Uact,1 with a second lower voltage threshold value Uu,2, where Uu,1<Uu,2<U1, and
if Uact,1>Uu,2, the first actuation unit ends the transfer of energy from the second vehicle electrical system branch to the first vehicle electrical system branch.

2. The vehicle electrical system of claim 1, wherein the first comparison unit has at least one comparator.

3. The vehicle electrical system of claim 1, further comprising a voltage-limiting switch.

4. The vehicle electrical system of claim 3, wherein the voltage-limiting switch has at least one freewheeling diode.

5. The vehicle electrical system of claim 1, further comprising:
a second detection unit configured to detect an instantaneous voltage Uact,2 of the second vehicle electrical system branch, and
a second comparison unit configured to compare the detected instantaneous voltage Uact,2 with a third upper voltage threshold value Uo,3 and a third lower voltage threshold value Uu,3, where Uu,3<U2<U0,3.

6. The vehicle electrical system of claim 5, wherein the first actuating unit is further configured to actuate the at least one DC/DC converter such that energy is transferred from the second vehicle electrical system branch to the first vehicle electrical system branch if Uact,2>U0,3, and such that energy is transferred from the first vehicle electrical system branch to the second vehicle electrical system branch if Uact,2<Uu,3.

7. The vehicle electrical system of claim 1, wherein the at least one DC/DC converter comprises a synchronous converter.

8. A vehicle comprising:
a vehicle electrical system comprising:
a first vehicle electrical system branch with a first nominal voltage U1,
a second vehicle electrical system branch with a second nominal voltage U2,
at least one DC/DC converter configured to transfer energy between the first vehicle electrical system branch and the second vehicle electrical system branch,
a first actuating unit configured to actuate the at least one DC/DC converter,
a first detection unit configured to detect an instantaneous voltage Uact, 1 of the first vehicle electrical system branch, and
a first comparison unit configured to compare the detected instantaneous voltage Uact,1 with a first upper voltage threshold value Uo,1 and a first lower voltage threshold value Uu,1, where Uu,1<U1<U0,1,
wherein the first actuating unit is configured to actuate the at least one DC/DC converter such that energy is transferred from the first vehicle electrical system branch to the second vehicle electrical system branch if Uact,1>Uo,1, and such energy is transferred from the second vehicle electrical system branch to the first vehicle electrical system branch if Uact,1<Uu,1, wherein if Uact,1>Uo,1, after the actuation of the at least one DC/DC converter:
the first detection unit detects a second value of the instantaneous voltage Uact,1 of the first vehicle electrical system branch,
the first comparison unit compares the detected second value of the instantaneous voltage Uact,1 with a second upper voltage threshold value Uo,2, where U1<Uo,2<Uo,1, and
if Uact,1<Uo,2, the first actuation unit ends the transfer of energy from the first vehicle electrical system branch to the second vehicle electrical system branch, and wherein if Uact,1<Uu,1, after the actuation of the at least one DC/DC converter:
the first detection unit detects a second value of the instantaneous voltage Uact,1 of the first vehicle electrical system branch,
the first comparison unit compares the detected second value of the instantaneous voltage Uact,1 with a second lower voltage threshold value Uu,2, where Uu,1<Uu,2<U1, and
if Uact,1>Uu,2, the first actuation unit ends the transfer of energy from the second vehicle electrical system branch to the first vehicle electrical system branch.

9. A method for operating a vehicle electrical system having a first vehicle electrical system branch with a first nominal voltage U1, a second vehicle electrical system branch with a second nominal voltage U2, and at least one DC/DC converter configured to transfer energy between the first vehicle electrical system branch and the second vehicle electrical system branch, the method comprising:
detecting a first value of an instantaneous voltage Uact,1 of the first vehicle electrical system branch,
comparing the detected first value of the instantaneous voltage Uact,1 with a first upper voltage threshold value Uo,1 and a first lower voltage threshold value Uu,1, where Uu,1<U1<Uo,1, and
if Uact,1>Uo,1, actuating the at least one DC/DC converter such that energy is transferred from the first vehicle electrical system branch to the second vehicle electrical system branch, and if Uact,1<Uu,1, actuating the at least one DC/DC converter such that energy is transferred from the second vehicle electrical system branch to the first vehicle electrical system branch,
wherein if Uact,1>Uo,1, the method further comprises, after the actuation of the at least one DC/DC converter:
detecting a second value of the instantaneous voltage Uact,1 of the first vehicle electrical system branch,
comparing the detected second value of the instantaneous voltage Uact,1 with a second upper voltage threshold value Uo,2, where U1<Uo,2<Uo,1, and
if Uact,1<Uo,2, ending the transfer of energy from the first vehicle electrical system branch to the second vehicle electrical system branch, and
if Uact,1<Uu,1 the method further comprises, after the actuation of the at least one DC/DC converter:
detecting a second value of the instantaneous voltage Uact,1 of the first vehicle electrical system branch,
comparing the detected second value of the instantaneous voltage Uact,1 with a second lower voltage threshold value Uu,2, where Uu,1<Uu,2<U1, and
if Uact,1>Uu,2 ending the transfer of energy from the second vehicle electrical system branch to the first vehicle electrical system branch.

10. The method of claim 9, wherein if Uact,1>Uo,1 the transfer of energy from the first vehicle electrical system branch to the second vehicle electrical system branch is ended after a predetermined time period.

11. The method of claim 9, wherein if $U_{act,1} < U_{u,1}$ the transfer of energy from the second vehicle electrical system branch to the first vehicle electrical system branch is ended after a predetermined time period.

* * * * *